(12) United States Patent
Rinholm et al.

(10) Patent No.: US 12,063,891 B2
(45) Date of Patent: Aug. 20, 2024

(54) ADJUSTABLE LIFT RATE SYSTEM FOR GRASS MOWING MACHINE

(71) Applicant: DEERE & COMPANY, Moline, IL (US)

(72) Inventors: Brent G. Rinholm, Fuquay Varina, NC (US); Zackary P. Sipper, Raleigh, NC (US)

(73) Assignee: DEERE & COMPANY, Moline, IL (US)

( * ) Notice: Subject to any disclaimer, the term of this patent is extended or adjusted under 35 U.S.C. 154(b) by 684 days.

(21) Appl. No.: 16/802,008

(22) Filed: Feb. 26, 2020

(65) Prior Publication Data
US 2021/0259154 A1 Aug. 26, 2021

(51) Int. Cl.
| | | |
|---|---|---|
| A01D 75/30 | (2006.01) | |
| A01D 34/00 | (2006.01) | |
| A01D 34/44 | (2006.01) | |
| A01D 34/54 | (2006.01) | |
| A01D 69/03 | (2006.01) | |
| A01D 34/64 | (2006.01) | |
| A01D 34/74 | (2006.01) | |

(52) U.S. Cl.
CPC ........... *A01D 75/30* (2013.01); *A01D 34/006* (2013.01); *A01D 34/44* (2013.01); *A01D 34/54* (2013.01); *A01D 69/03* (2013.01); *A01D 2034/645* (2013.01); *A01D 34/74* (2013.01)

(58) Field of Classification Search
CPC ...... A01D 69/03; A01D 75/30; A01D 75/303; A01D 34/00–34/905; A01D 75/00–306
See application file for complete search history.

(56) References Cited

U.S. PATENT DOCUMENTS

| | | | | |
|---|---|---|---|---|
| 4,864,805 A | * | 9/1989 | Hager | A01D 75/30 56/11.9 |
| 4,878,338 A | | 11/1989 | Aldred et al. | |
| 5,123,234 A | | 6/1992 | Harada et al. | |
| 5,524,424 A | * | 6/1996 | Halgrimson | A01D 41/127 701/1 |
| 5,822,960 A | * | 10/1998 | Kitamura | A01D 75/30 56/DIG. 15 |
| 5,934,051 A | | 8/1999 | Hahn | |
| 6,052,973 A | * | 4/2000 | Tsuchihashi | A01D 75/306 56/7 |
| 6,122,903 A | | 9/2000 | Hayashi et al. | |

(Continued)

FOREIGN PATENT DOCUMENTS

| | | |
|---|---|---|
| EP | 1958496 A1 | 8/2008 |
| WO | WO9424844 A1 | 11/1994 |

OTHER PUBLICATIONS

Extended European Search Report and Written Opinion issued in European Patent Application No. 21154289.9, dated Jul. 14, 2021, in 13 pages.

*Primary Examiner* — Adam J Behrens
*Assistant Examiner* — Madeline I Runco

(57) ABSTRACT

An adjustable lift rate system on a grass mowing machine such as a riding greensmower having a lift and lower circuit including a plurality of hydraulic lift cylinders to lift and lower a plurality of cutting units, and a controller providing a current to a proportional solenoid valve to bypass the hydraulic lift cylinders. An operator control may be used to adjust the current to the proportional solenoid valve to adjust the lift and lower rate of the cutting units.

10 Claims, 5 Drawing Sheets

(56) References Cited

U.S. PATENT DOCUMENTS

| | | |
|---|---|---|
| 6,351,929 B1 | 3/2002 | Gust et al. |
| 11,089,727 B2 * | 8/2021 | Baldwin ............... A01D 41/141 |
| 2004/0045289 A1 * | 3/2004 | Ikeda .................... E02F 9/2214 |
| | | 60/469 |
| 2006/0218915 A1 * | 10/2006 | Dix ........................ F15B 21/08 |
| | | 60/469 |
| 2017/0188509 A1 | 7/2017 | Boruff et al. |

* cited by examiner

ADJUSTABLE LIFT RATE SYSTEM FOR GRASS MOWING MACHINE

FIELD OF THE INVENTION

This invention relates generally to grass mowing machines, and specifically to an adjustable lift rate system for cutting units on a riding greensmower, trim and surround mower or fairway mower.

BACKGROUND OF THE INVENTION

Grass mowing machines such as riding greensmowers, trim and surround mowers and fairway mowers may include internal combustion engines to power a hydrostatic traction drive circuit, hydraulic mowing circuit, and hydraulic circuits to raise and lower the cutting units, or for other functions.

In the past, these mowers have included lift and lower systems for the cutting units, with lift arms actuated by hydraulic cylinders. The front row of cutting units may be lifted and lowered before one or more rear cutting units. Variation in the weight of cutting units, and different engine speeds, may affect the lift rate for cutting units which may be undesirable for the mowing conditions. An adjustable lift rate system is needed that an operator may use to adjust lift rates to be suitable for different mowing conditions, cutting units, and engine speeds. An adjustable lift rate system also is needed that can slow the drop rate as the cutting units approach the ground.

SUMMARY OF THE INVENTION

An adjustable lift rate system for raising and lowering a plurality of cutting units of a grass mowing machine. The rate of raising and lowering the cutting units may be operator adjustable using a display. The adjustment may change the current to a proportional solenoid valve to bypass the hydraulic cylinders for the lift arms.

DESCRIPTION OF THE PREFERRED EMBODIMENT

Figure 1:
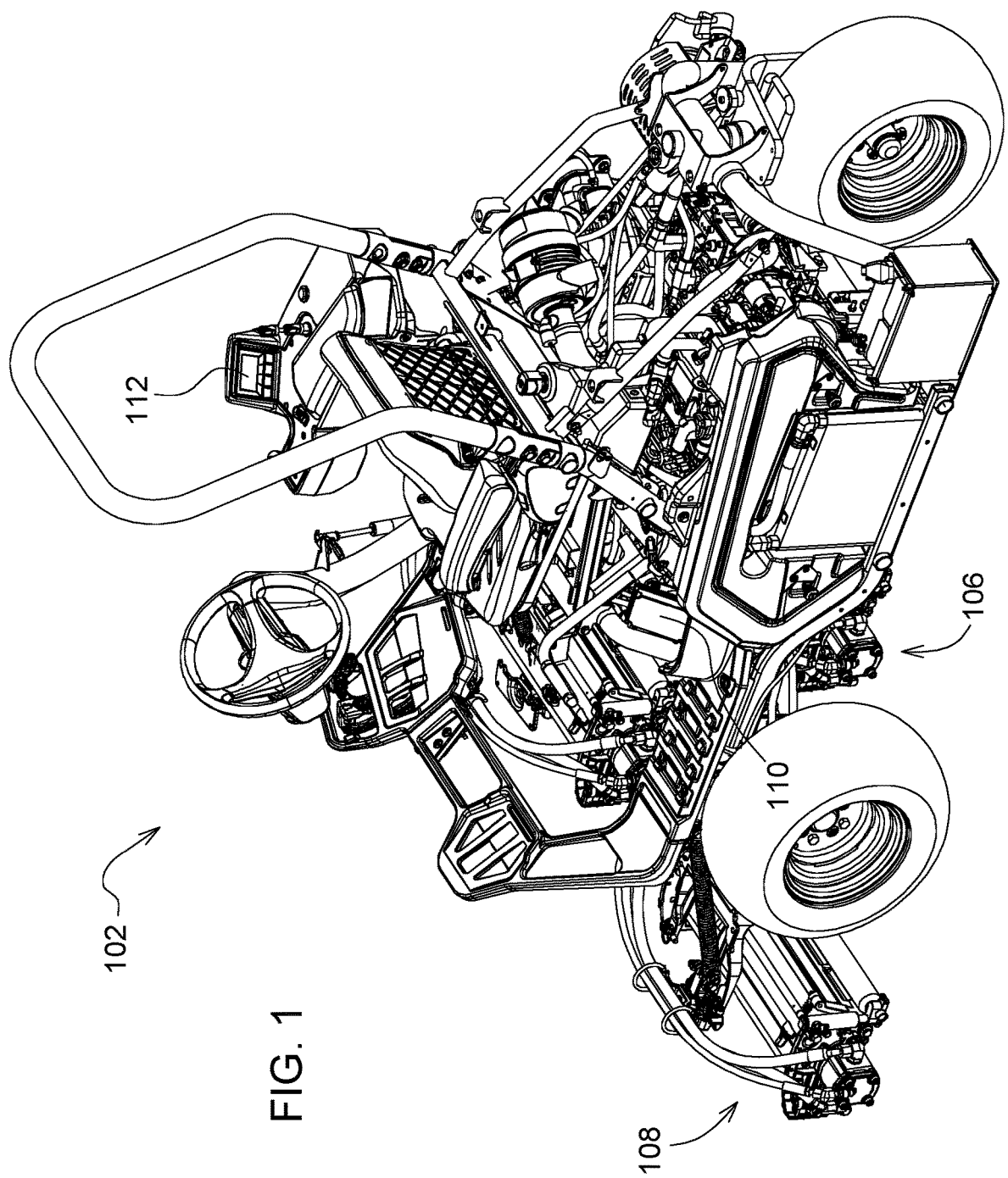
FIG. 1 is a perspective view of a riding greensmower with an adjustable lift rate system according to one embodiment of the invention.
Figure 2:
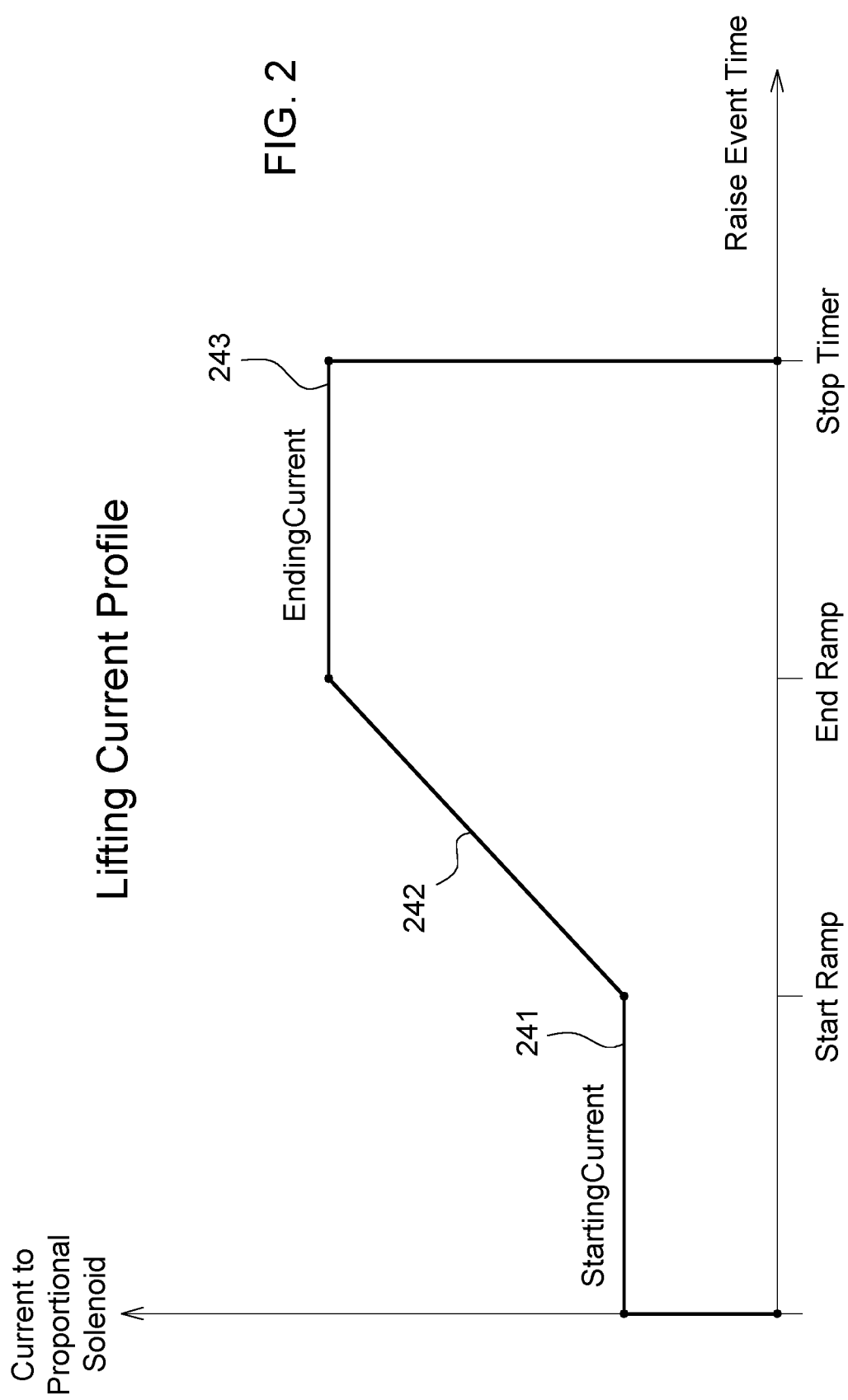
FIG. 2 is a diagram of a current profile of an adjustable lift rate system according to one embodiment of the invention.

In an embodiment shown in FIGS. 1-5, adjustable lift rate system 100 may be on riding greensmower 102 having three or more reel cutting units, or on a trim and surround mower or fairway mower with multiple reel cutting units. The mower may be powered by internal combustion engine 104, and may have a hydrostatic traction drive circuit 106, and/or hydraulic mow circuit 108, and lift and lower circuit 109 for the cutting units.

In one embodiment, the adjustable lift rate system may include a proportional solenoid valve 128 to divert hydraulic fluid to bypass hydraulic cylinders 120, 122, 124 of the lift and lower circuit. Higher current to the solenoid may result in a slower lift rate, and lower current may result in a faster lift rate. Current to the proportional solenoid valve may be adjusted by the operator to adjust the lift rate and change the back pressure of the hydraulic lift and lower circuit. The adjustable lift rate system also may bypass or divert more hydraulic fluid at higher engine speeds, and less hydraulic fluid at lower engine speeds, to maintain similar feel for lifting and lowering cutting units at various engine speeds.

In one embodiment shown in FIGS. 1-5, the adjustable lift rate system may include a display 112 on the mower that an operator may use to adjust the lift rate. The display may include a symbol such as a bar graph 114 showing the lift rate setting. The display input may be manual controls such as plus/minus buttons 116, 118 that an operator may use to adjust the lift rate to suit mowing conditions. The manual controls may adjust the current to the proportional solenoid valve which changes the bypass rate for the hydraulic cylinders of the lift and lower system.

Figure 3:
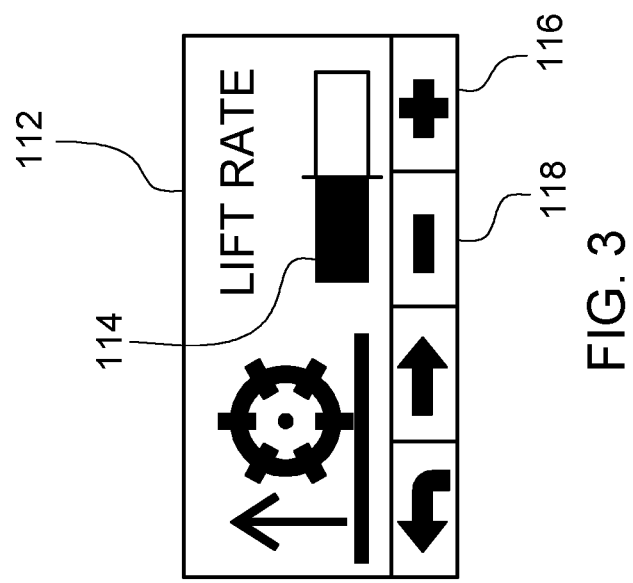
FIG. 3 is a drawing of an operator input device of an adjustable lift rate system according to one embodiment of the invention.

In an embodiment, shown in FIG. 3, adjustable lift rate system 100 may include a ramped current profile to the proportional solenoid valve. The ramped current profile may be used to lift or lower the cutting units while mowing. The current to the proportional solenoid may be held constant if the cutting units are lifted and lowered while in transport. FIG. 3 shows the raise event time on the horizontal axis. Current to the proportional solenoid valve is on the vertical axis. When the operator actuates a switch to lift the cutting units, the starting current 241 may be constant until a start timer expires. Then the current may ramp up as shown at 242. When the end timer expires, ending current 243 may be held constant until the raise timer ends. The ramped current profile 242 may slow the lift rate as the cutting units approach the top of the lift. This keeps the cutting units from bouncing and softens the impact of the cutting units against upper stops. The ramped current profile also may be used to slow the lower rate as the cutting units reach the ground. The adjustable lift rate system also may slow control of the front two lift cylinders independently from the one rear lift cylinder.

Figure 4:
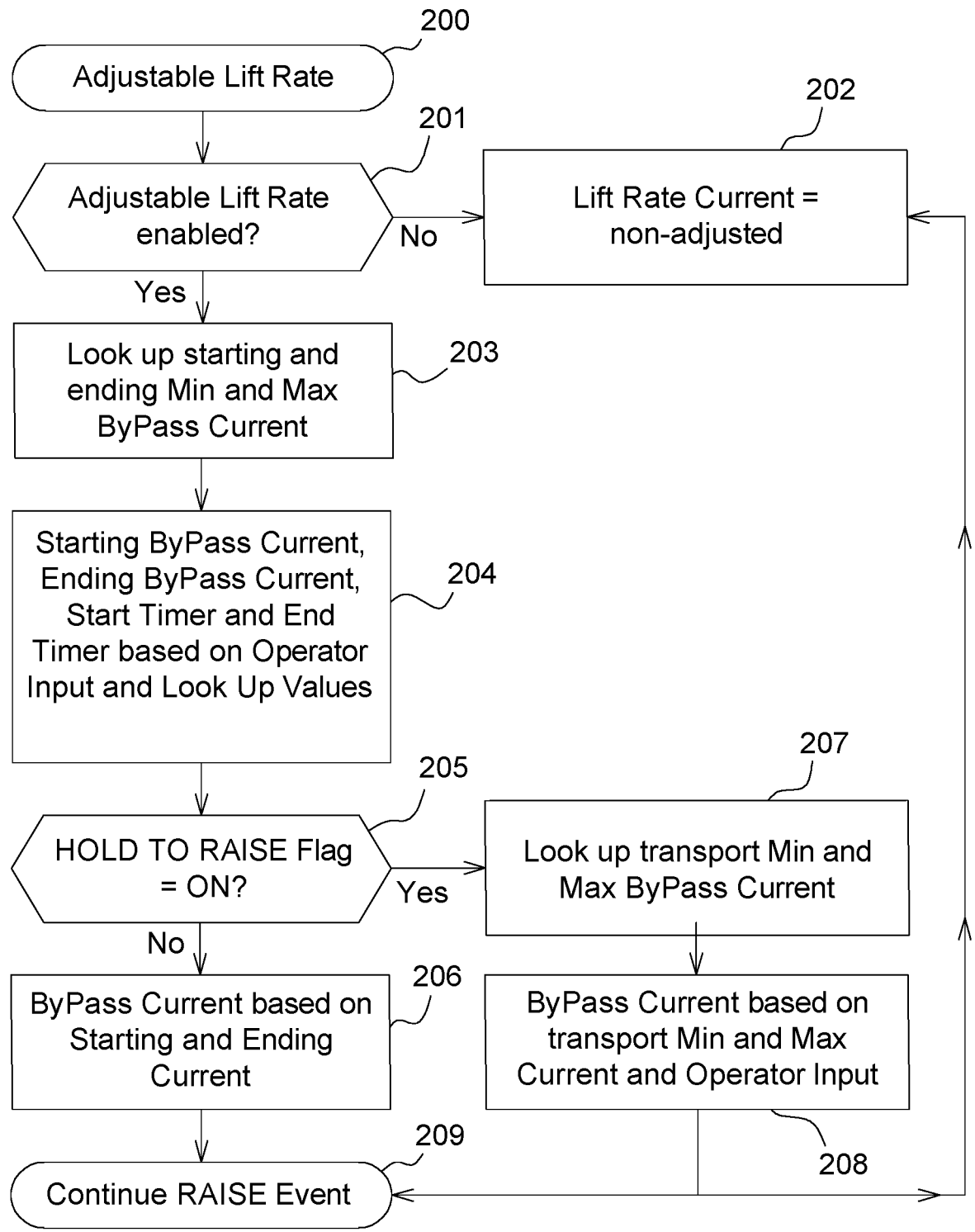
FIG. 4 is a logic diagram for computer software that may be used in the adjustable lift rate system according to one embodiment of the invention.

In one embodiment, the adjustable lift rate system may include a vehicle controller with software logic shown in FIG. 4, starting in block 200. If the adjustable lift rate system is not enabled in block 201, the current to the proportional solenoid valve may be set as a non-adjusted value in block 202. If the adjustable lift rate system is enabled, a look up table in block 203 may be used to determine the starting maximum current, starting minimum current, ending maximum current and ending minimum current for the proportional solenoid valve. The look up table may use engine speed to determine initial minimums and maximums, and to determine value ranges for the starting and ending currents. For example, the starting and ending values of the ramp may be determined using engine speed breakpoints. The adjustable lift rate system then may calculate the starting current, ending current, start timer and end timer in block 204, based on the operator input to the display, along with the minimum and maximum starting and ending currents found in block 203. In block 205, the system may determine if the hold to raise flag is on, indicating the PTO switch is off for transport. If it is in transport, a look up table in block 207 may be used to determine the minimum and maximum current to the proportional solenoid. The current to the proportional solenoid then may be set as a constant in block 208 based on the operator input described above, and the transport minimum and maximum current as the raise event continues in block 209. In block 206, if the hold to raise flag is off, indicating the PTO is on for mowing, current to the proportional solenoid may be set at a constant starting current for the duration of the start timer, current may be ramped up until the end timer, and then held constant at an ending current as the raise event continues in block 209 until the raise timer finishes.

In one embodiment, the adjustable lift rate system may also be used by an operator to adjust the rate of lowering the cutting units. The operator may make the adjustments using the same input on the display. The input may be used to adjust the current to the proportional solenoid that bypasses or diverts hydraulic fluid from the hydraulic lift cylinders when lowering the cutting units.

Figure 5:
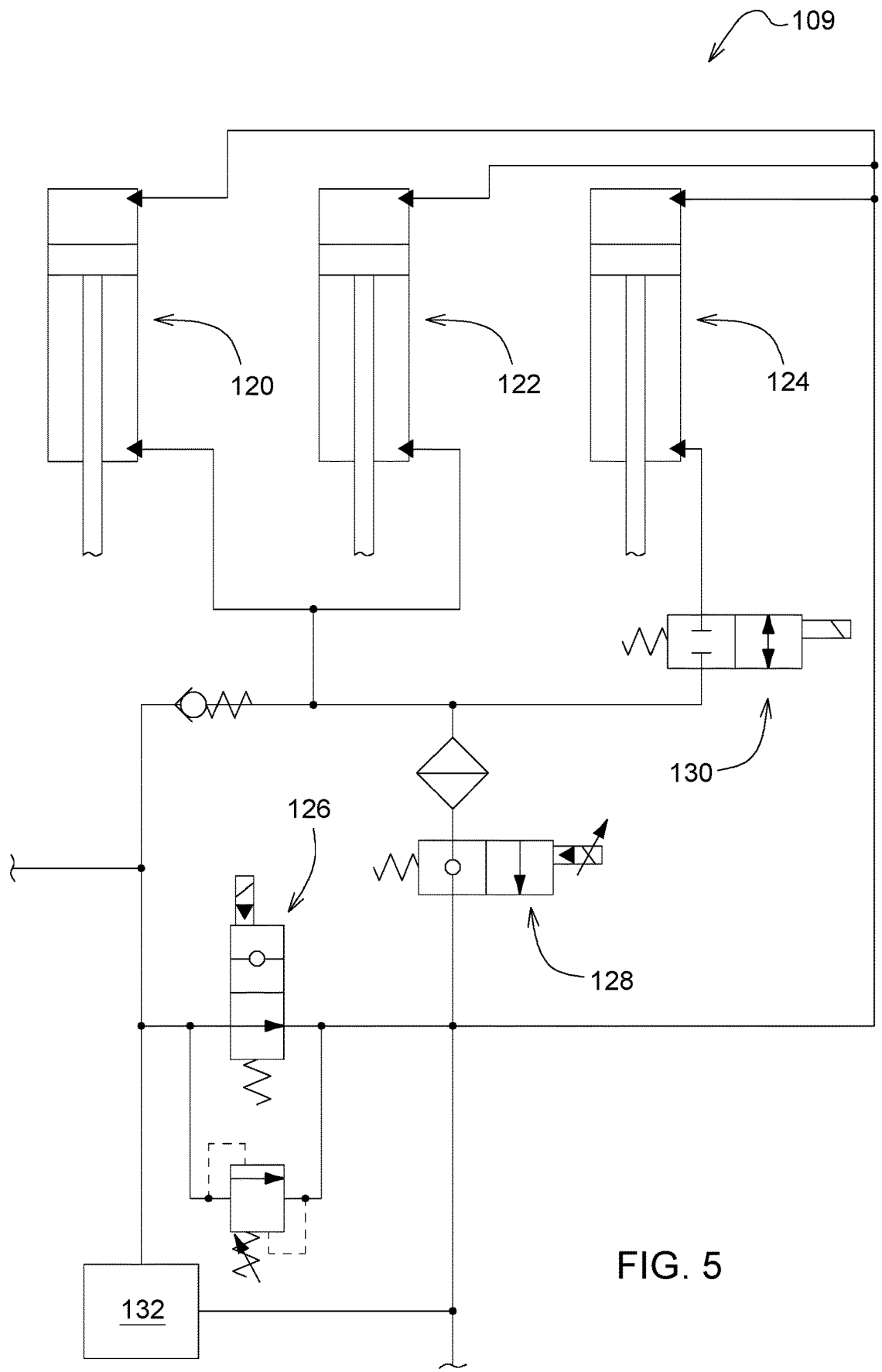
FIG. 5 is a hydraulic schematic drawing of a raise/lower subcircuit with an adjustable lift rate system according to one embodiment of the invention.

As shown in the hydraulic schematic diagram of FIG. 5, the adjustable lift rate system may include proportional solenoid valve 128 which may be operator adjustable to divert or reduce the flow rate to lift cylinders 120, 122, 124. The hydraulic lift and lower circuit 109 may include left and right front lift cylinders 120, 122 for the left and right front cutting units, and rear lift cylinder 124 for the rear cutting unit. The lift and lower circuit also may include lift valve 126 which may be closed when the cutting units are lifted, timing valve 130 to provide a time delay so that the front cutting units may be lifted or lowered before the rear cutting unit, and filtration circuit 132. If the operator uses the display to slow the lift rate, current to the proportional solenoid valve increases, and the proportional solenoid valve diverts more hydraulic fluid from the lift cylinders. If the operator uses the display to speed up the lift rate, current to the proportional solenoid valve decreases, and the proportional solenoid diverts less hydraulic fluid from the lift cylinders.

Having described a preferred embodiment, it will become apparent that various modifications can be made without departing from the scope of the invention as defined in the accompanying claims.

The invention claimed is:

1. An adjustable lift rate system, comprising:
    a riding greensmower having a lift and lower circuit including a plurality of hydraulic lift cylinders to lift and lower a first row of grass mowing units followed by a second row of grass mowing units;
    a bypass around the plurality of hydraulic lift cylinders responsive to a proportional solenoid valve;
    an operator control on the riding greensmower for commanding the proportional solenoid valve to divert hydraulic fluid from the plurality of hydraulic lift cylinders to the bypass to adjust a lift rate and a lower rate of the first row and the second row of grass mowing units; and
    a controller that provides a constant starting current, a ramp of increasing current, and a constant ending current, thereby automatically slowing the lift rate as the grass mowing units approach a top of a lift.

2. The adjustable lift rate system of claim 1 wherein the operator control increases a current to the proportional solenoid valve during the lifting of the first row and the second row of grass mowing units.

3. The adjustable lift rate system of claim 1 wherein the operator control increases a current to the proportional solenoid valve to slow the lift rate of the first row and the second row of grass mowing units.

4. An adjustable lift rate system comprising:
    a lift and lower circuit for raising and lowering a first row and a second row of grass mowing units of a grass mowing machine; and
    a controller that controls a rate of raising and lowering the first row and the second row of grass mowing units based on an operator adjustable display, and reduces the rate in a ramped profile during the raising and lowering of the first row and the second row of grass mowing units.

5. The adjustable lift rate system of claim 4 wherein the lift and lower circuit is a hydraulic circuit having a plurality of hydraulic cylinders.

6. The adjustable lift rate system of claim 4 further comprising a proportional solenoid valve that receives an increased current from the controller to reduce the rate during raising of the first row and the second row of grass mowing units.

7. The adjustable lift rate system of claim 6 wherein the increased current from the controller includes a starting current that is constant, a ramp of increased current, and an ending current that is constant.

8. An adjustable lift rate system comprising:
    a first row and a second row of grass mowing units;
    a lift arm supporting each grass mowing unit;
    a hydraulic cylinder connected to a hydraulic fluid circuit to raise and lower each lift arm;
    a bypass around the hydraulic cylinder;
    a proportional solenoid valve that is operator adjustable to divert the hydraulic fluid from the hydraulic cylinders to the bypass when raising and lowering of the lift arms supporting the first row followed by the second row of grass mowing units; and
    a controller that provides a constant starting current, then a ramp of increasing current, and a constant ending current, thereby slowing the raising and lowering of the lift arms as the grass mowing units approach a fully raised or a fully lowered position.

9. The adjustable lift rate system of claim 8 wherein a current to the proportional solenoid valve is operator adjustable and increases as the hydraulic fluid diverted from the hydraulic cylinders to the bypass increases.

10. The adjustable lift rate system of claim 9 wherein the operator control increases the current as the first row and the second row of grass mowing units are raised or lowered.

* * * * *